Nov. 11, 1930.  R. J. WALLACE  1,781,419
PLIERS OR TONGS
Filed April 24, 1929
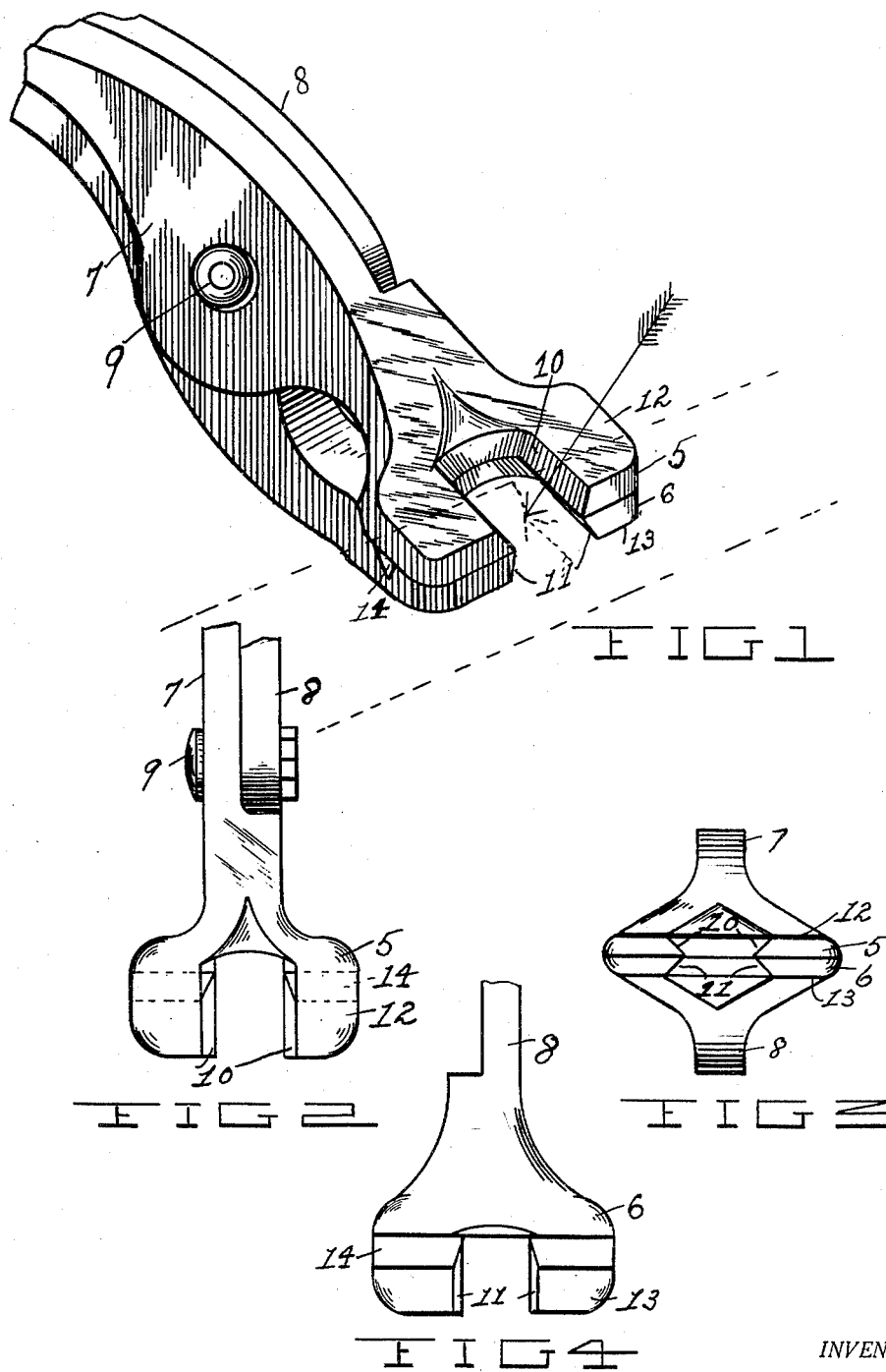
INVENTOR.
Ralland J Wallace Patented Nov. 11, 1930

1,781,419

UNITED STATES PATENT OFFICE

RALLAND J. WALLACE, OF OKLAHOMA CITY, OKLAHOMA

PLIERS OR TONGS

Application filed April 24, 1929. Serial No. 357,863.

This invention relates to tongs, and has for its object to provide each jaw thereof with an opening through which work can be performed, while the jaws are holding the parts in place for various sorts of operations.

Primarily, while the invention is usable for any operation, the device is adapted more especially for welding broken or torn portions of sheet metal, for instance, fenders of automobiles, where the edges of the same have been torn, slit or ripped, and where especially the parts are disaligned by being bent out of shape.

The device will draw these bent parts into alignment, when the work to be performed may be accomplished through the opening, for instance, a torch may play a welding flame through the opening.

Referring to the drawings, accompanying and forming a part of the specification, Figure 1 is a perspective view of the device, the levers thereof being partly broken away.

Figure 2 is a plan view thereof, looking down on the jaws of the device.

Figure 3 is a front view looking at the jaws.

Figure 4 is a view in plan looking at the jaw which is provided with the seam or edge receiving groove.

In these views, similar characters of reference indicate similar parts.

The tongs are composed of two jaws 5 and 6 formed integral with the levers 7 and 8 which are united by the usual pivot 9.

Each jaw is provided with an opening and the walls thereof are flared or tapered at 10 and 11 in opposed planes and toward the outer faces 12 and 13 of each jaw so as to provide flame accommodation for the torch while performing the work, or in case of other work, to allow the application of a tool from all angles while operating.

One of the jaws, for instance 13 is provided with a transverse or cross-sectional groove 14 to receive the turned edge or seam of sheet metal parts while allowing the jaws to come together to hold the parts irrespective of a seam, rolled or overturned edge.

Of course, it will be understood that the size of the opening and the angularity of the walls may be varied to suit the demands of the manufacture, as well as the kinds of work to be done.

Having thus set forth the invention I claim:

A tool comprising a pair of cooperating jaws, a lever integral with each jaw and a pivot for the levers, said jaws being bifurcated by substantially rectangular notches opening at the front end of the jaws and tapering from the gripping face of each jaw outwardly, one of said jaws being provided with a uniform groove across its entire width and parallel to the axis of the pivot and to the front end of the tool.

RALLAND J. WALLACE.